UNITED STATES PATENT OFFICE.

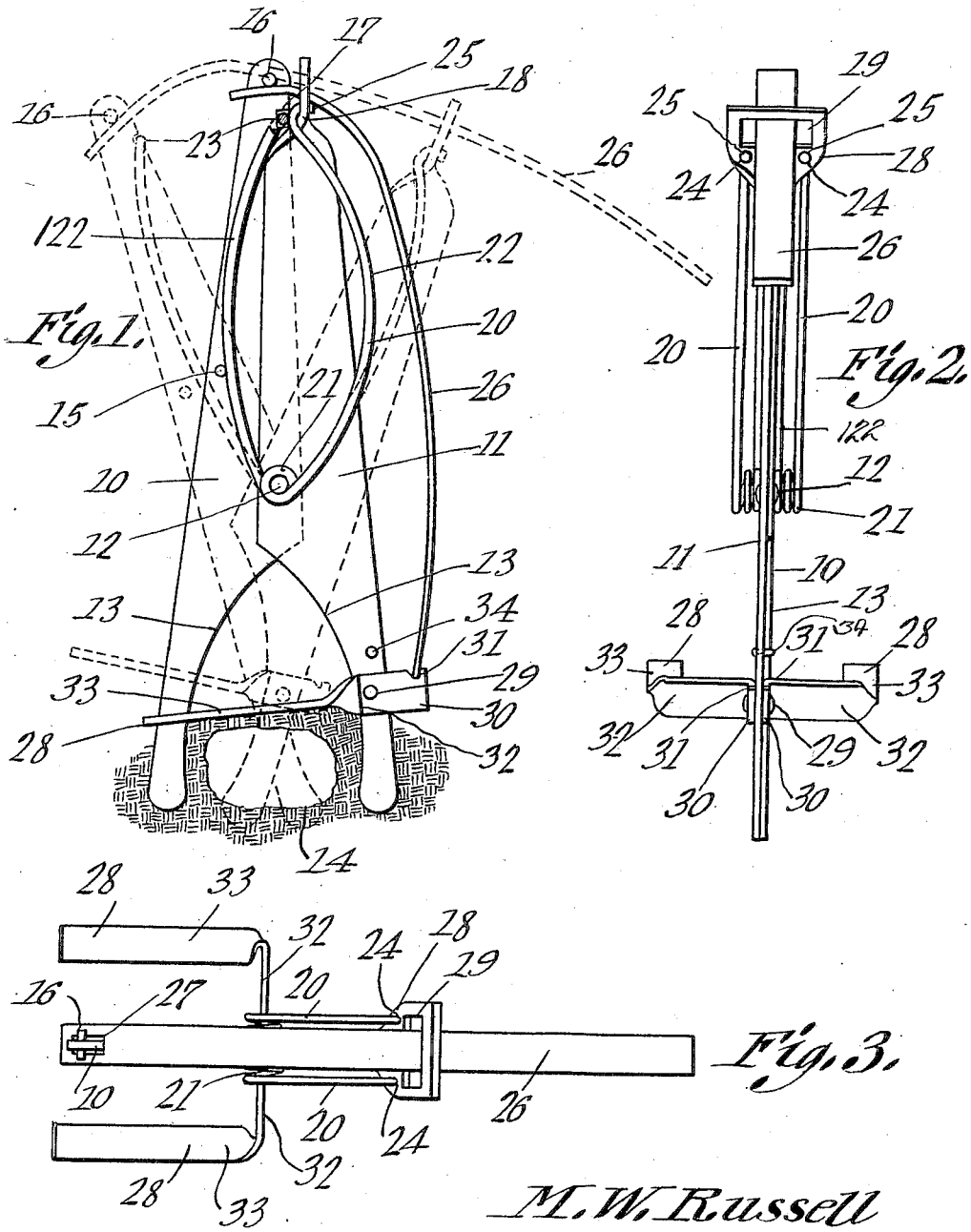

MANNING W. RUSSELL, OF CURTIS, LOUISIANA.

MOLE-TRAP.

1,385,024.   Specification of Letters Patent.   Patented July 19, 1921.

Application filed February 7, 1920. Serial No. 356,929.

*To all whom it may concern:*

Be it known that I, MANNING W. RUSSELL, a citizen of the United States, residing at Curtis, in the parish of Bossier and State of Louisiana, have invented a new and useful Mole-Trap, of which the following is a specification.

This invention aims to provide novel means for operating and controlling the jaws of a mole-trap.

In the drawings:—

Figure 1 shows in side elevation, a trap constructed in accordance with the invention, the solid-line disclosure depicting the trap as it will appear when set, and the dotted-line disclosure depicting the trap as it will appear when sprung; Fig. 2 is an elevation wherein the trap is viewed at right angles to the showing of Fig. 1; and Fig. 3 is a top plan of the trap.

The trap comprises a pair of jaws 10 and 11 pivoted together intermediately of their ends, and adjacent to their inner edges, as shown at 12. The gripping portions of the jaws 10 and 11 are concaved on their inner edges as indicated at 13, so as to span a mole hole 14.

The jaw 10 carries a transverse pin 15 and a cross pin 16 is mounted in said jaw near the upper end thereof. Adjacent to the pin 16, the jaw 10 is provided with a notch 17.

The jaw 11 is twisted at right angles to form a lip 18 having a slot 19. A V-shaped spring 20 has its coils 21 located adjacent to the pivot element 12 upon opposite sides of the jaws 10—11. The spring 20 is made of a single section of resilient wire or other metal bent to form legs 22 and a loop 122, the loop bearing against the pin 15, and the bend 23 of the loop being seated in the notch 17. The ends of the arms 22 are hooked as at 25 into openings 24 in the part 18 of the jaw 11. The spring 20 tends to force the lower ends of the jaws 10—11 toward each other as shown in dotted lines in Fig. 1 so as to hold the mole. A resilient latch-strip 26 is provided, one end thereof having an opening 27 which receives the upper extremity of the jaw 10 below the cross pin 16. The latch 26 is held on the jaw 10 by the pin 16 and by the bend 23 of the spring 20 and extends downwardly through the slot 19 longitudinally of the jaw 11 when the trap is set. Triggers 28 are pivoted at 29 to the jaw 11 and are located on opposite sides thereof, the triggers having parallel portions 30 disposed at the opposite sides of the jaw 11. The portions 30 of the triggers are provided upon their upper edges with notches 31 adapted to receive the extremity of the latch 26 when the trap is set. The triggers 28 are independently movable, and are outwardly extended from the parts 30 in opposite directions as indicated at 32, the triggers being twisted so as to extend horizontally in parallel relation as shown at 33 thereby to increase the surface against which the animal will exert upward pressure in passing through hole 14. When the triggers are tilted on their pivots 29 by upward pressure the latch 26 is released, and the latch owing to its resiliency will spring upward, releasing the jaws 10—11 so that their lower ends will move toward each other, under the action of the spring 20 and grip the animal traversing the hole 14. A cross pin 34 in the jaw 11 is adapted to engage the parallel portions 30 of the triggers 28 to prevent the triggers from swinging too far out of place when the trap is not in use.

Having thus described my invention what I claim is:

1. A mole trap comprising jaws; a pivot element uniting the jaws intermediate their ends; a V-shaped spring connected to the jaws at one end of the jaws and provided with oppositely disposed coils located adjacent to the pivot element; a latch strip carried by the above specified end of one jaw and movably engaged with the corresponding end of the other jaw whereby, when said ends of the jaws are moved toward each other, the strip will extend longitudinally of the jaws; and oppositely disposed triggers pivoted to one jaw at the extremity of the strip and provided with notches engaging said extremity of the strip to hold the opposite ends of the jaws spaced, the triggers projecting laterally beyond the jaws and being upwardly movable to release the strip.

2. A mole trap comprising pivotally connected jaws; spring means for forcing the lower ends of the jaws toward each other; a latch coöperating with the jaws to hold the trap set; and pivotally mounted triggers disposed on opposite sides of the jaws and coöperating with the latch, the operation of both triggers being necessary before the latch is released, thereby to insure the entrance of a mole between the lower ends of the jaws.

3. A mole trap comprising sheet metal jaws disposed facewise in slightly overlapping relation and pivoted intermediately of their ends, one of said jaws being narrower than the other and provided with a notch at the inner edge of its upper extremity, the other jaw being twisted at right angles at its adjacent extremity and said jaw being slotted at said twisted portion, a spring having arms disposed upon opposite sides of the jaws and bent from a single strip having a bent portion engaging said notch, the other extremities being anchored in said twisted portion, a pin carried by one jaw to limit the movement of the spring with respect thereto, a slotted strip engaged over the first-mentioned jaw, means to prevent displacement of said strip from said jaw, said strip extending through the slot of the second-named jaw, and angular trigger members pivoted to the second-named jaw at each side, the inner edges of said extremities of the jaws being recessed to provide arcuate gripping portions, said gripping portions being adapted to be projected into the ground at either side of a mole hole or run, said trigger members having notched portions projecting from the outer edge of the second-named jaw for engagement by the free end of the strip and having twisted portions horizontally disposed to engage the ground above the hole or run, whereby when the animal passes through the same, upward pressure will be exerted against said trigger members to release said strip whereby the jaws will move to a closed position.

4. A mole trap comprising flat jaws pivoted together, spring means normally tending to move the jaws in overlapping relation at their gripping ends, a latch engaging both of said jaws and movable with respect to one of said jaws thereby to swing the same to a set position against the action of the spring means, and triggers carried by one of said jaws for engagement with the latch whereby the trap may be held in a set position, one of said jaws being provided with means to limit the pivotal movement of the triggers.

5. A mole trap comprising jaws pivotally connected intermediate their ends, one jaw having a transverse projection at its upper end; a spring comprising a loop having a bend engaged with said jaw, and arms engaging the other jaw; a latch passing slidably through said other jaw and provided with an opening receiving the first specified jaw between the projection and the bend of the spring; and a trigger movably mounted on one jaw and coöperating with the latch.

In testimony that I claim the foregoing as my own, I have hereto affixed my signature in the presence of two witnesses.

MANNING W. RUSSELL.

Witnesses:
JOHN W. AGETE,
WILL T. HAWKINS.